United States Patent
Subramanian

(10) Patent No.: US 12,319,261 B2
(45) Date of Patent: Jun. 3, 2025

(54) METHOD FOR ESTIMATING A BRAKE FACTOR PARAMETER IN A BRAKING SYSTEM, AND VEHICLE IMPLEMENTING THE SAME

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 417 days.

(21) Appl. No.: 17/862,270

(22) Filed: Jul. 11, 2022

(65) Prior Publication Data
US 2023/0026361 A1    Jan. 26, 2023

(30) Foreign Application Priority Data

Jul. 22, 2021 (EP) .................................. 21187277

(51) Int. Cl.
*B60T 8/172* (2006.01)
*B60T 8/171* (2006.01)

(52) U.S. Cl.
CPC .............. *B60T 8/172* (2013.01); *B60T 8/171* (2013.01); *B60T 2210/12* (2013.01); *B60T 2270/86* (2013.01)

(58) Field of Classification Search
CPC ...... B60T 8/172; B60T 8/171; B60T 2210/12; B60T 2270/86
See application file for complete search history.

(56) References Cited

U.S. PATENT DOCUMENTS

2010/0211279 A1* 8/2010 Lingman ................. B60T 8/248
                                                      701/70
2018/0201243 A1* 7/2018 Pennala .................. B60T 13/66

FOREIGN PATENT DOCUMENTS

| CN | 113085815 A | 7/2021 |
| WO | 9011213 A1 | 10/1990 |
| WO | 2005097572 A1 | 10/2005 |

OTHER PUBLICATIONS

Extended European Search Report for European Patent Application No. 21187277.5, mailed Dec. 16, 2021, 7 pages.

* cited by examiner

*Primary Examiner* — Andrew J Cromer
(74) *Attorney, Agent, or Firm* — Withrow & Terranova, PLLC

(57) ABSTRACT

Method for estimating a brake factor parameter, the brake factor parameter being defined as a ratio of a braking torque over a braking pressure, the braking torque being applied on a wheel of a vehicle by a braking wheel sub-system of a braking system of the vehicle, the braking pressure being applied by the braking wheel sub-system to achieve the braking torque on the wheel of the vehicle, the method comprising collecting input parameters and estimating the brake factor parameter as a function of the at least one input parameter, an output of the step of estimating being an open loop estimation of the brake factor parameter.

9 Claims, 3 Drawing Sheets

[Fig. 1]
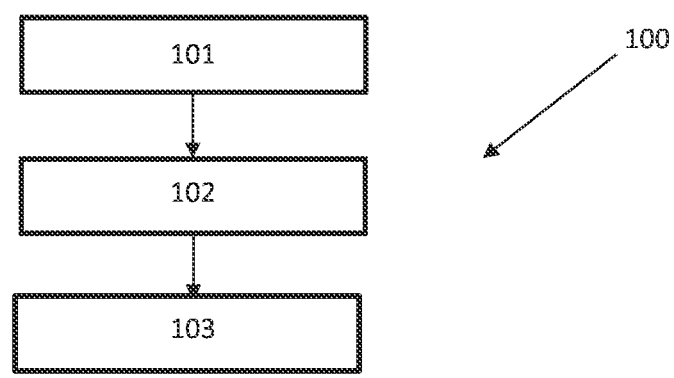

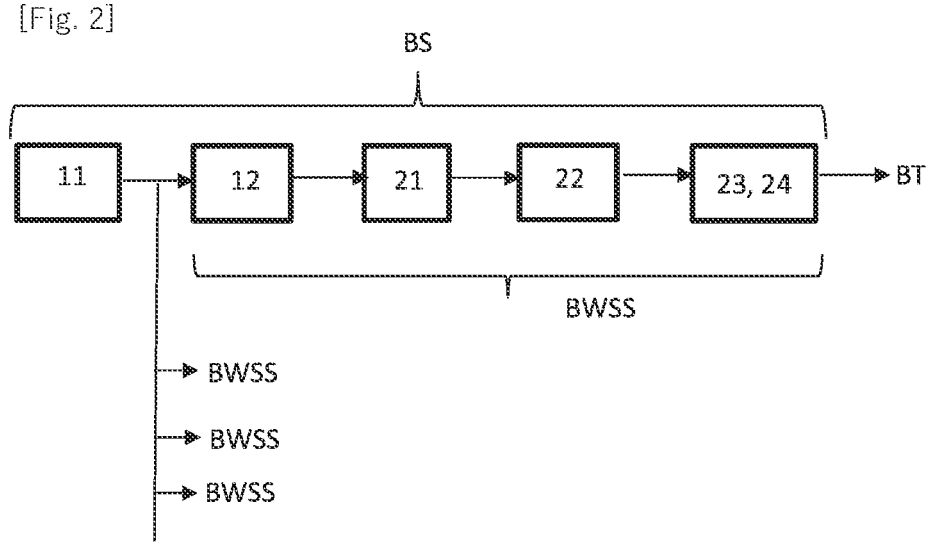
[Fig. 2]

[Fig. 3]
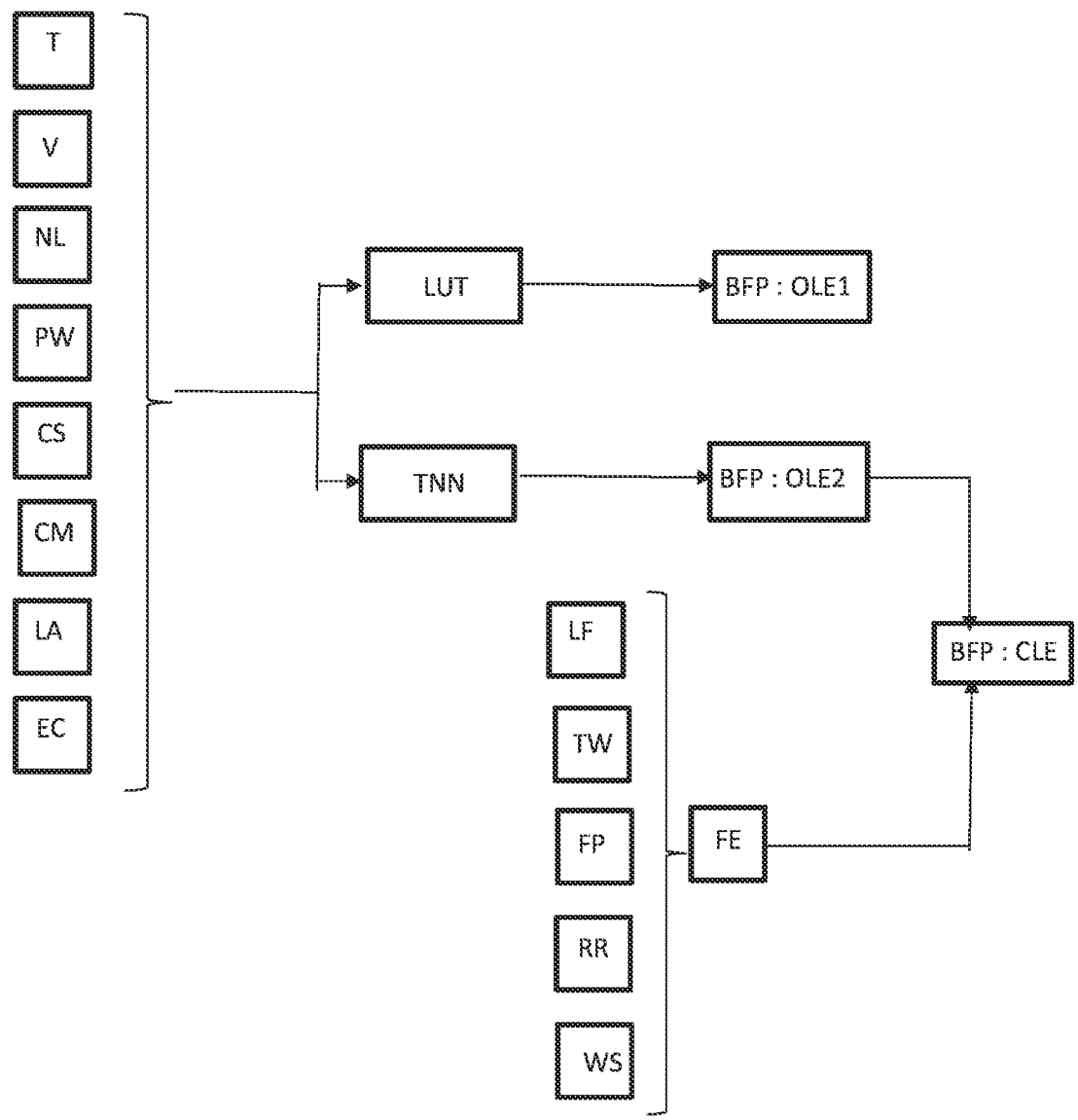

METHOD FOR ESTIMATING A BRAKE FACTOR PARAMETER IN A BRAKING SYSTEM, AND VEHICLE IMPLEMENTING THE SAME

RELATED APPLICATIONS

The present application claims priority to European Patent Application No. 21187277.5, filed on Jul. 22, 2021, and entitled "METHOD FOR ESTIMATING A BRAKE FACTOR PARAMETER IN A BRAKING SYSTEM, AND VEHICLE IMPLEMENTING THE SAME," which is incorporated herein by reference in its entirety.

TECHNICAL FIELD

This invention relates to the field of braking control system.

BACKGROUND

It is known to use a brake factor parameter in a braking control system of a vehicle. The brake factor parameter is defined, by the man skilled in the art, as a braking torque applied to the wheel by the braking system divided by the braking pressure applied on the brake pads by the braking system to achieve said braking torque. This parameter is used by many different braking functions, such as Hill Start Aid (HSA), Automatic Traction Control (ATC), Vehicle Stability/Electronic Stability Program (ESP), Antilock Braking System (ABS), Adaptive Cruise Control (ACC), Emergency Braking, External Brake request (XBR); An External Brake request (XBR) is a brake request sent by another Electronic Control Unit (ECU), such as transmission control unit for cruise control, or safety system control unit for emergency braking, said External Brake request (XBR) being sent to the Braking Electronic Control Unit.

The closed loop control system works based on estimating the forces from the longitudinal deceleration sensed. The target deceleration is used to determine the force on the tires, the force on the tires would be converted to the torque on the tire, further determining what would be the braking pressure to achieve that braking torque, in return achieve that braking force and finally the targeted deceleration. Also for other state estimator models, this brake factor is used.

At present, the brake factor parameter is a constant end of line parameter set in the Electronic Control Unit (ECU) using said brake factor parameter to determine the braking torque from the braking pressure or vice-versa. For example, the brake factor parameter is set to a value of 4000 Nm/B ar.

However, the true brake factor changes based on temperature, such as braking pads temperature and/or braking rotor temperature, relative speed of the wheel with respect to the fixed braking pads, pressure in the braking chamber, wear of the braking pads; also the dynamic rolling radius changes with tire pressure, speed and normal load. Therefore, the single point or constant end of line parameter will not work on all driving conditions.

At present, there are no models to solve this issue; the controller is being tuned to operate over diverse driving conditions.

Therefore, there is a need for a method to estimate the brake factor parameter to dynamically change the brake factor parameter in the braking electronic control unit and in any other electronic control unit which uses this parameter. This method would help in increasing the performance of the braking system in all vehicle control systems by reducing the under braking or over braking in electronic braking controls.

SUMMARY OF THE INVENTION

To that end, the present invention provides a method for estimating a brake factor parameter, the brake factor parameter being defined as a ratio of a braking torque over a braking pressure, the braking torque being applied on a wheel of a vehicle by a braking wheel sub-system of a braking system of the vehicle, the braking pressure being applied by the braking wheel sub-system to achieve the braking torque on the wheel of the vehicle, the method comprising the following steps controlled by a braking system control unit:
  collecting input parameters;
  estimating the brake factor parameter as a function of the input parameters, an output of the step of estimating being an open loop estimation of the brake factor parameter.

According to an embodiment, the method further comprises a step of communicating other electronic control units in the vehicle the result of the step of estimation of the brake factor parameter.

According to these dispositions, the method allows the estimation of the brake factor parameter to dynamically change, according to input parameters, in the braking electronic control unit and in any other electronic control unit which uses this parameter.

According to an embodiment, the invention comprises one or more of the following features, alone or in any combination technically compatible.

According to an embodiment, the input parameters are collected via a CAN bus of the vehicle.

According to an embodiment, the input parameters are provided by at least one other electronic control unit of the vehicle, and/or by at least one sensor.

According to an embodiment, the input parameters comprise at least the followings:
  a temperature, said temperature being measured on a pad and/or on a rotor of the braking wheel sub-system;
  a velocity of the wheel relative to the pad of the braking wheel sub-system;
  a normal load of a tire of the wheel;

According to an embodiment, the input parameters further comprise:
  a chamber size of a braking chamber of the braking wheel sub-system;
  a chamber manufacturer of the braking chamber of the braking wheel sub-system;
  a lever arm parameter of the braking wheel sub-system;
  a pad wear of the pad of the braking wheel sub-system.

According to an embodiment, the lever arm parameter is a lever arm ratio.

According to an embodiment, the open loop estimation is obtained from the input parameters and from a look-up table.

According to an embodiment, the step of estimating the brake factor parameter comprises using a trained neuron network to provide the open loop estimation.

According to these provisions, the accuracy of the open loop estimation is better.

According to an embodiment, the input parameters further comprises at least one environmental input parameter.

According to an embodiment, the at least one environmental input parameter comprises at least one of an ambient temperature, an atmosphere pressure, a road surface condition parameter, a tire-road contact parameter, miles on the vehicle.

According to these provisions, the open loop estimation is more accurate.

According to an embodiment, the method further comprises a step of comparing the open loop estimation of the brake torque parameter with a feedback estimation of the brake torque parameter based on at least one tire parameter measured by or estimated from information collected by tire sensors placed on the tire of the wheel, an output of the step of comparing being a closed loop estimation of the brake torque parameter, the closed loop estimation of the brake torque parameter being a function of the open loop estimation and of the feedback estimation.

According to an embodiment, the at least one tire parameter comprises at least one of a dynamic rolling radius of the tire, a longitudinal force applied on the tire at a point of contact of the tire and a road, a friction parameter indicative of a friction between the tire and the road, a wheel slip parameter, and a tire wear parameter.

According to an embodiment, the feedback estimation results from a braking torque estimation based on the at least one tire parameter, divided by a pressure measured in the braking chamber of the braking system.

According to an aspect, the invention also concerns a vehicle comprising a braking system and an electronic control unit configured to implement the method according to anyone of the embodiment described hereinbefore.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which the same reference refer to similar elements or to elements having similar functions, and in which:

FIG. 1 is a schematic representation of the sequence of steps of the method according to the invention.

FIG. 2 is a schematic representation of the main components of a braking system.

FIG. 3 is a schematic representation of the inputs and outputs of the method according to the invention.

DETAILED DESCRIPTION

The invention is a method 100 implemented by an electronic control unit of a braking system BS of a vehicle, said electronic control unit being configured to use a brake factor parameter BFP defined as a ratio of a braking torque BT over a braking pressure. As illustrated schematically on FIG. 2, the braking system of the vehicle conventionally comprises a brake pedal 11 which generates pressure in the braking circuit. The pressure in the braking circuit is received as an input in each braking wheel sub-system BWSS comprising a brake chamber 12 configured to convert pneumatic pressure into mechanical force on calipers 21 on each wheel of the vehicle. The braking wheel sub-system BWSS comprises for example a brake chamber 12, a caliper 21, a lever arm 22, configured to press braking pads 23 against a brake rotor 24 to generate the braking torque BT on a wheel of the vehicle, according to the braking pressure generated dispatched by the braking circuit to the braking wheel sub-system BWSS.

The brake factor parameter BFP is conventionally used by the electronic control unit to determine the braking pressure which should be generated at the level of the braking wheel sub-system BWSS to achieve an appropriate braking torque BT of each wheel, to achieve in return a braking force and finally a targeted deceleration of the vehicle. In the prior art, the brake factor parameter BFP is considered constant, and is tuned to operate over diverse driving conditions. Therefore, since it is tuned to operate in diverse conditions, it is not perfect in any specific condition, and would have a steady state error.

The electronic control unit may be inside a separate and specific braking system electronic control unit or inside a more general electronic control unit of the vehicle implementing anyone of different functions such as, but not limited to, Hill Start Aid (HSA), Automatic Traction Control (ATC), Vehicle Stability/Electronic Stability Program (ESP), Antilock Braking System (ABS), Adaptive Cruise Control (ACC), Emergency Braking, External Brake request (XBR). The electronic control unit receives input parameters from the CAN bus of the vehicle, or from at least one other electronic control unit of the vehicle or directly from at least one sensor, for example from tire sensors placed on the tire of the wheels to collect tire parameters such as a dynamic rolling radius RR of the tire, a longitudinal force LF applied on the tire at a point of contact of the tire and a road, a friction parameter FP indicative of a friction between the tire and the road, a wheel slip parameter WS, and a tire wear parameter TW indicative of a wear level of the tire.

As illustrated schematically on FIG. 3, the input parameters, other than tire parameters, considered here, are at least the following parameters:
  a temperature T, said temperature being measured on a pad 23 and/or on a rotor 24 of the braking wheel sub-system BWSS;
  a velocity V of the wheel relative to the pads 23 of the braking wheel sub-system BWSS;
  a normal load NL of a tire of the wheel;
Optionally, the input parameters may also comprise:
  a chamber size C of a braking chamber 12 of the braking system BS;
  a lever arm parameter LA of the braking wheel sub-system BWSS;
  a pad wear PW of the pads 23 of the braking wheel sub-system BWSS.
For example, the lever arm parameter is lever arm ratio.
More optionally, the input parameters may further comprise:
  a chamber manufacturer CM of the braking chamber 12 of the braking system BS;
  at least one environmental input parameter EC.
In particular, the at least one environmental input parameter comprises at least one of an ambient temperature, an atmosphere pressure, a road surface condition parameter, a tire-road contact parameter, miles on the vehicle, etc . . . .

The method 100 according to the invention is intended to dynamically change the brake factor parameter BFP in the electronic control unit using the input parameters T, V, NL, PW, CS, CM, LA, EC.

Thus, the method 100 comprises the following steps controlled by a braking system control unit:
  collecting 101 the input parameters T, V, NL, PW, CS, CM, LA, EC;
  estimating 102 the brake factor parameter BFP as a function of the input parameters T, V, NL, PW, CS, CM, LA, EC, an output of the step of estimating being an open loop estimation OLE1, OLE2 of the brake factor parameter BFP.

In a first variant of the method 100, the open loop estimation OLE1 is obtained from the input parameters T, V, NL, PW, CS, CM, LA, EC by using a look-up table LUT. According to this variant, a dimension of the look-up table is the number of input parameters used, i.e. three at minimum. The look-up table is prepared with data collected from the sensors for each input parameter, and with the output brake factor parameter BFP corresponding to each combination of input parameters collected. For any new combination of input parameters, a new output brake factor parameter BFP will be estimated by interpolation using the combinations of input parameters present in the look-up table.

In a second variant of the method 100, the step of estimating 102 the brake factor parameter BFP comprises using a trained neuron network TNN to provide the open loop estimation OLE2 the brake factor parameter BFP.

The neural network takes in features, i.e. input parameters, and send them to the bias and weights in its hidden layers and provides an output. During training state, the bias and weights are constantly adjusted to match the predicted output to the actual output. During training, also called labelling, a sensor provides the actual output to teach the neural network.

After training, based on the adjusted weights and bias, the trained neural network predicts with good accuracy the output from the input parameters.

The features could be classified as high sensitive features, or input parameters, and low sensitive features. High sensitive features are those who play a major role in the output. Less sensitive ones are only added to increase complexity and also support marginal increase in accuracy. For example, with atmosphere temperature the accuracy would be 98% and without atmosphere temperature the accuracy would be 95%.

In a third variant, the method 100 comprises a step of comparing 103 the open loop estimation OLE2 of the brake torque parameter BFP with a feedback estimation FE of the brake torque parameter BFP; said feedback estimation FE is based on at least one tire parameter LF, TW, FP, RR, WS measured by or estimated from information collected by tire sensors placed on the tire of the wheel; an output of the step of comparing 103 is a closed loop estimation CLE of the brake torque parameter BFP, the closed loop estimation CLE of the brake torque parameter BFP being a function of the open loop estimation OLE2 and of the feedback estimation FE.

For example, when the neural network open loop estimation OLE2 outputs a brake factor parameter BFP to be X, and when a feedback estimation FE based on the tire parameters is Y, as in a conventional control system, an error X-Y will be calculated and fed into a controller to set the estimation right for the neural network.

As an example, the feedback estimation FE results from a braking torque BT estimation based on the at least one tire parameter LF, TW, FP, RR, WS, divided by a pressure measured in the braking chamber 12 of the braking system BS.

According to an aspect, the invention also relates to a vehicle comprising a braking system BS and an electronic control unit configured to implement the method 100 according to anyone of the preceding claims.

The invention claimed is:

1. A method for estimating a brake factor parameter, the brake factor parameter being defined as a ratio of a braking torque over a braking pressure, the braking torque being applied on a wheel of a vehicle by a braking wheel sub-system of a braking system of the vehicle, the braking pressure being applied by the braking wheel sub-system to achieve the braking torque on the wheel of the vehicle, the method comprising the following steps controlled by a braking system control unit:
   collecting input parameters;
   estimating the brake factor parameter, as a function of the input parameters, using a trained neuron network (TNN) to generate an open loop estimation of the brake factor parameter;
   comparing the open loop estimation of the brake factor parameter with a feedback estimation of the brake factor parameter to generate a closed loop estimation of the brake factor parameter; and
   updating the estimated brake factor parameter based on the closed loop estimation of the brake factor parameter;
   wherein:
      the feedback estimation of the brake factor parameter is based on at least one tire parameter, the at least one tire parameter measured by or estimated from information collected by at least two tire sensors placed on a tire of the wheel,
      the closed loop estimation of the brake factor parameter is a function of the open loop estimation and the feedback estimation, and
      the updated brake factor parameter is used as a control parameter for one or more vehicle functions.

2. The method of claim 1, where the input parameters comprise:
   a temperature, the temperature being measured on a pad and/or on a rotor of the braking wheel sub-system;
   a velocity of the wheel relative to the pad of the braking wheel sub-system; and
   a normal load of the tire of the wheel.

3. A vehicle comprising a braking system and an electronic control unit configured to implement the steps of the method of claim 1.

4. The method of claim 1, wherein the input parameters comprise:
   a chamber size of a braking chamber of the braking system,
   a lever arm parameter of the braking wheel sub-system, and
   a pad wear of the pads of the braking wheel sub-system.

5. The method of claim 1, wherein the one or more vehicle functions comprise one or more of: a hill start aid (HSA) function, an automatic traction control (ATC) function, an electronic stability program (ESP) function, an antilock braking system (ABS) function, an adaptive cruise control (ACC) function, an emergency braking function, and an external brake request (XBR) function.

6. The method of claim 1, wherein the at least one tire parameter comprises one or more of: a dynamic rolling radius of the tire, a longitudinal force applied on the tire at a point of contact of the tire and a road, a friction parameter indicative of a friction between the tire and the road, a wheel slip parameter, and a tire wear parameter.

7. The method of claim 1, wherein the feedback estimation of the brake factor parameter is derived from a braking torque estimation based on the at least one tire parameter divided by a pressure measured in a braking chamber of the braking system.

8. The method of claim 2, wherein the input parameters further comprise at least one environmental input parameter.

9. The method of claim 8, wherein the at least one environmental input parameter comprises one or more of: an ambient temperature, an atmospheric pressure, a road surface condition parameter, a tire-road contact parameter, and vehicle mileage.

* * * * *